United States Patent
Brombach

(10) Patent No.: US 11,598,312 B2
(45) Date of Patent: Mar. 7, 2023

(54) METHOD FOR CONTROLLING A WIND POWER INSTALLATION AT DIFFERENT OPERATING POINTS

(71) Applicant: Wobben Properties GmbH, Aurich (DE)

(72) Inventor: Johannes Brombach, Berlin (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 17/329,850

(22) Filed: May 25, 2021

(65) Prior Publication Data

US 2021/0372367 A1 Dec. 2, 2021

(30) Foreign Application Priority Data

May 26, 2020 (EP) .................................... 20176671

(51) Int. Cl.
*F03D 7/02* (2006.01)

(52) U.S. Cl.
CPC ........... *F03D 7/028* (2013.01); *F03D 7/0224* (2013.01)

(58) Field of Classification Search
CPC ...... F03D 7/0224; F03D 7/028; F03D 7/0284; F05B 2270/32; F05B 2270/327; F05B 2270/328; F05B 2270/335
See application file for complete search history.

(56) References Cited

FOREIGN PATENT DOCUMENTS

WO 2018/033191 A1 2/2018

OTHER PUBLICATIONS

Mirzaei et al., "Model Based Active Power Control of a Wind Turbine", 2014 American Control Conference (ACC), Jun. 4-6, 2014, Portland, Oregon, USA, pp. 5037-5042.
Hoek et al., "Comparison of Down-Regulation Strategies for Wind Farm Control and their Effects on Fatigue Loads", 2018 Annual American Control Conference (ACC), Jun. 27-29, 2018, Wisconsin Center, Milwaukee, USA, pp. 3116-3121.

*Primary Examiner* — Tulsidas C Patel
*Assistant Examiner* — S. Mikailoff
(74) *Attorney, Agent, or Firm* — Seed Intellectual Property Law Group LLP

(57) ABSTRACT

A method for controlling a wind power installation is provided. The method includes operating the installation at a normal operating point at which the installation is not operated in a throttled fashion if there is no request for throttling, and operating the installation at a throttled operating point, in response to a throttle request, with output power which is throttled in comparison with the normal operating point. The method includes changing the operation from the throttled operating point to a reserve operating point at which the installation is operated with higher output power in response to a power increase request. The throttled operating point has a higher tip speed ratio than that of the reserve operating point and is positioned on an associated iso-characteristic curve in the $\lambda\theta$ diagram having, at the throttled operating point, a negative characteristic curve gradient.

19 Claims, 4 Drawing Sheets

METHOD FOR CONTROLLING A WIND POWER INSTALLATION AT DIFFERENT OPERATING POINTS

BACKGROUND

Technical Field

The present invention relates to a method for controlling a wind power installation. The present invention also relates to a wind power installation.

Description of the Related Art

In order to operate a wind power installation at an optimum operating point, the installation is typically operated in partial load mode when the wind speed is below a rated wind speed. In the case of a wind power installation with a variable rotational speed and a rotor with rotor blades with an adjustable blade angle, such an operating point is characterized by the rotational speed, the blade angle and the resulting output power level. If the optimal operating point is set, the output power level for the wind speed which is then present is therefore the maximum power level which the wind power installation can generate continuously at the wind speed.

In order to represent this operating point and other operating points, a tip speed ratio/blade angle diagram is frequently used, said diagram being referred to here as a $\lambda\theta$ diagram. In this $\lambda\theta$ diagram, the tip speed ratio $\lambda$ of the respective operating point is therefore entered for the corresponding value of the blade angle $\theta$ of the same operating point.

The tip speed ratio $\lambda$ is generally defined as the ratio of the tip speed of the rotor blade to the wind speed. The resulting tip speed ratio $\lambda$ is therefore without units. The consideration of the relationship between the rotational speed and wind speed permits the $\lambda\theta$ diagram to be used for different wind speeds. Therefore, operating points of different wind speeds can be entered in the same diagram. In an ideal case, operating points at different wind speed can even be identical in this diagram.

Such identical operating points occur during partial load operation if the blade angle remains constant, that is to say does not change, at different wind speeds, and the rotational speed is proportional to the wind speed. Precisely such a state is also aimed at in the ideal design of a wind power installation. Specifically, if the rotational speed and wind speed change proportionally to one another, the leading-edge angle at which the air actually flows against the rotor blade therefore remains the same. It is also appropriate to leave the blade angle also unchanged.

The output power of course does not remain the same here because as the wind speed increases and the rotational speed increases it is also possible to generate more power.

In addition it is customary and appropriate to enter into the $\lambda\theta$ diagram power coefficient values, which are also referred to as Cp values. Such a power coefficient therefore indicates the efficiency with which the corresponding operating point can convert wind power into rotational power. Operating points with the same Cp value are entered on a common line for the sake of better illustration, said common line being respectively a closed line. For example, such Cp characteristic curves can be entered in increments of 0.05. These characteristic curves are also referred to as iso-characteristic curves. With optimum configuration of the wind power installation their operating point lies at the maximum possible Cp value, somewhat larger than 0.45, in the partial load mode.

The definition of an operating point is therefore comparatively unambiguous, specifically as far as possible such that the power yield is as high as possible, which frequently gives rise to an operating point which lies within the iso-characteristic curve which has the highest Cp value. Depending on boundary conditions it may, however, be the case that operating points cannot reach this ideal value. In particular at very low wind speeds it is possible, for example, for frictional states to be so dominant that an operating point with a comparative high rotational speed, that is to say a relatively high tip speed ratio should be selected, said operating point being then able to also have an increased blade angle. The maximum rotational speed of a wind power installation is also limited. Therefore, starting from a specific wind speed the rotational speed of the installation must not rise any further, and operating points occur outside the optimum. However, such operating states can also be determined by means of simulations or, under certain circumstances, adaptation processes in situ.

It is then considered that it is necessary to satisfy additional requirements which specify a redundant output power level. For example, a reduced output power level can be required for a time period which can be, for example, 15 minutes, but also can last several hours, in order in this way to cope with the situation of the electric supply network. Such a situation can occur when there is a corresponding low demand for power, but it can also be required in order to provide a reserve power level. When a reserve power level is provided, the wind power installation is operated with lower output power than is possible on the basis of the prevailing wind, so that when there is a sudden rise in the power demand the production of power by the installation can then increase, specifically can increase continuously to the maximum power level which can be generated with the prevailing wind. However, other specifications are also considered, such as for example the specification that the wind power installation is to operate in reduced fashion in order to minimize noise. The reduction can relate to an output power here, but also to a rotational speed.

If there is a requirement for a reduction in power there are many possible ways of selecting a corresponding operating point. At any rate, the optimum operating point, that is to say the operating point at a maximum Cp value is no longer selected because this would bring about the maximum power level, which is, however, not desired. The operating point with reduced power can be selected, for example, in such a way that the reduced output power is generated with the lowest possible wear. The operating point can also be selected in such a way that it is particularly stable, and small changes in the wind speed therefore do not bring about a stalling effect, that is to say an aerodynamic collapse.

However, the desire to select an operating point with the lowest possible wear can also give rise to different variants. Therefore, low wear can be present if the rotational speed of the wind power installation is as low as possible. However, this can lead to a situation in which when there are changes in wind speed the rotor blades frequently have to be re-adjusted in terms of their attitude angle, resulting in an operating point which is then not low in wear with respect to the adjustment drives of the rotor blades. A quality criterion which incorporates such different requirements can possibly be defined here.

Then, further situations can occur in which the wind power installation has to be adjusted as quickly as possible from a reduced operating point toward a less reduced operating point. Such a requirement can also arise from the conditions of the electric supply network, particularly a rapid change in frequency in the network frequency of the electric supply network can trigger such a demand. Particularly if the network frequency of the electric supply network drops to a lower limiting value, which can be, for example, 0.3% below the network rated frequency, it may be necessary for the wind power installation which is operated in a reduced fashion to quickly increase its output power, specifically in particular with a network frequency which drops further.

This then results in the problem of finding an operating point for this new situation. It may also be necessary here to find the transition from the reduced operating point to the operating point which is reduced less—or under certain circumstances even no longer reduced at all.

In the European priority application the European Patent Office has searched the following prior art documents: WO 2018/033191 A1; Daan van der Hoek et al., "Comparison of Down-Regulation Strategies for Wind Farm Control and their Effects on Fatigue Loads", 2018 Annual American Control Conference (ACC), AACC, 27 Jun. 2018, pages 3116-3121; Mahmood Mirzaei et al, "Model Based Active Power Control of a Wind Turbine", American Control Conference (ACC), IEEE, 4 Jun. 2014, pages 5037-5042.

BRIEF SUMMARY

A reduced operating point is provided herein. In particular, this reduced operating point is to be selected as advantageously as possible also with respect to a further change to a less reduced operating point. In particular, a proposal is also given for the selection of such a less reduced operating point. An alternative to previously known solutions is to be at least proposed.

A method for controlling a wind power installation is proposed. Therefore, a wind power installation is assumed which has a rotor with rotor blades with an adjustable blade angle, and wherein the rotor can be operated with a variable rotational speed. In this respect, a customary wind power installation can be taken as the starting point.

The method relates to the case in which the wind power installation is operated in a partial load range. The partial load range is characterized in that there is not sufficient wind to operate the wind power installation at a rated power level. Therefore, the wind speed is also below a rated wind speed. In this context, the rotational speed of the wind power installation is also frequently below a rated rotational speed.

The wind power installation can be operated at an operating point which can be specified in a variable fashion, and this operating point is characterized by the blade angle, that is to say the value of the blade angle, and by a tip speed ratio. This operating point can be represented in a $\lambda\theta$ diagram. Such a $\lambda\theta$ diagram, which can also be synonymously referred to as a tip speed ratio blade-angle diagram has already been described above in the introduction. In such a $\lambda\theta$ diagram, the tip speed ratio is plotted against the blade angle, and the operating point can then be represented in the $\lambda\theta$ diagram as a value pair composed of a blade angle and a tip speed ratio.

The operating point can therefore be represented by a value pair $(\theta, \lambda)$, $\theta$ denotes the blade angle or the value of the blade angle and $\lambda$ denotes the tip speed ratio. Furthermore, as has already been described in the introduction, each operating point is assigned a power coefficient, which can also be referred to as a Cp value. A plurality of operating points with the same Cp value can therefore be represented as an iso-characteristic curve in the $\lambda\theta$ diagram. Such an iso-characteristic curve is therefore composed of a large number of operating points with the same Cp value, wherein these can be fictional operating points but do not have to be operating points which are also provided in the specific control of the respective wind power installation. These iso-characteristic curves serve to characterize the aerodynamics of the wind power installation. The iso-characteristic curves can also be referred to synonymously as characteristic curves of the same Cp value or as characteristic curves of the same power coefficient.

According to one step, the wind power installation is operated at a normal operating point if there is no requirement for throttling. Such a normal operating point is characterized in that the wind power installation is not operated in a throttled fashion. The normal case is therefore that the wind power installation is operated at a normal operating point. However, it can, of course, also be the case that depending on the wind power installation there is continuously a requirement for throttling. However, even in this case basically a normally operating point is provided at which the wind power installation would also be operated if there were no requirement for throttling.

Moreover, the wind power installation is operated as a throttled operating point at which, in response to a throttling request, the wind power installation is operated with an output power level which is throttled in comparison with the normal operating point. At the throttled operating point, the wind power installation is therefore throttled, specifically in its output power, in comparison with the normal operating point. The installation therefore outputs less power and/or also generates less power from the wind than at the normal operating point. However, the wind power installation must nevertheless be operated; therefore if it is stopped it is as it were also throttled but there is no longer any operation of the wind power installation in this sense.

Furthermore, the changing over of the operation of the wind power installation from the throttled operating point to a reserve operating point is provided. At the reserve operating point, the wind power installation is operated with an increased power output level in comparison with the throttled operating point. The changeover from the throttled operating point to the reserve operating point is carried out in reaction to a power increase request. The wind power installation therefore outputs power at the reserve operating point, and is therefore operated with a higher output power level than at the throttled operating point. The reserve operating point therefore lies illustratively between the throttled operating point and the normal operating point. However, it is basically also considered that at the reserve operating point precisely the same amount of power is output than at the normal operating point. In this case, the normal operating point and the reserve operating point can nevertheless be different, for example can have a different tip speed ratio. However, less power is preferably output at the reserve operating point than at the normal operating point.

It is then proposed that the throttled operating point be selected in such a way that it has an increased tip speed ratio in comparison with the reserve operating point. It is basically assumed that the respectively compared operating points, that is to say the normal operating point, the throttled operating point and the reserve operating point, are operated at the same wind speed. Of course, the wind speed can change, and particularly in the case of a stopping throttling situation in which the wind power installation is therefore operated at the throttled operating point for a relatively long time period it is also to be assumed that the wind speed changes at least slightly. Nevertheless, for the comparative description it is to be assumed that the respective underlying wind speed is the same, because if the wind speed increases and as a result the throttled operating point changes, this increased wind speed is also to be assigned a changed normal operating point and also a changed reserve operating point, whether or not said wind is to be aimed at at the moment or not. Therefore, the comparisons also always relate to a situation in which the three specified operating points are based on the same wind speed.

Apart from the above, a change particularly from the throttled operating point to the reserve operating point can be carried out so quickly that it is also actually possible to assume virtually unchanged wind speed during this changeover process.

In order to select the throttled operating point it is therefore proposed that it has an increased tip speed ratio in comparison with the reserve operating point. In addition, for the selection of the throttled operating point it is proposed that it lies on an associated iso-characteristic curve in the $\lambda\theta$ diagram, and the associated iso-characteristic curve has, at the throttled operating point, a negative characteristic curve gradient in which the tip speed ratio decreases as the blade angle increases. The associated iso-characteristic curve is therefore that which also contains the throttled operating point. As already explained, such iso-characteristic curves are closed characteristic curves, which is the nature of the thing as long as they do not leave the representation range of the diagram. These characteristic curves or the respectively considered iso-characteristic curve therefore have/has sections which have a negative gradient and which have the one positive gradient. The gradient is also zero at two locations. Each iso-characteristic curve particularly basically has two regions with a negative gradient. A region thereof will basically appear to have a lower tip speed ratio than the normal operating point, and this region is not considered for the proposed throttled operating point. The other region, which is specifically proposed here, "top right" with respect to the optimum operating point, corresponds to the normal operating point, in the $\lambda\theta$ diagram. In the proposed region in which the throttled operating point is to be selected, the tip speed ratio and the blade angle are therefore predominantly larger than the tip speed ratio and the blade angle of the normal operating point.

The proposed region relates, however, to the reserve operating point, and the tip speed ratio is therefore to be selected as larger in comparison with the latter, and the iso-characteristic curve has to have a negative characteristic curve gradient.

It has been particularly realized here that through the proposed selection the throttled operating point has an increased rotational speed in comparison with the reserve operating point. If the output power is then to be incased in reaction to the power increase request, in particular is in fact to be increased quickly, the proposed selection of the throttled operating point is therefore advantageous. For the changeover, the rotational speed of the throttled operating point must in fact be reduced in order to be able to reach the reserve operating point. As a result more power has to be output and said power is therefore immediately available as soon as this reduction in rotational speed is carried out. In particular, the reduction in rotational speed can even be triggered by the increase in the output power.

It has also been realized that when the wind power installation is operating in the partial load range there is frequently still potential for increasing the rotational speed without coming up against technical limits. It has particularly been realized that the rated rotational speed can still be reached and an increase in rotational speed is possible without putting the wind power installation at risk. However, it has also been realized that depending on the prevailing wind speed the rotational speed can lie only slightly below the rated rotational speed and nevertheless there is a small potential for increasing the rotational speed. A significant reduction in the power coefficient can be achieved by changing the operating point in the region in which the iso-characteristic curves have a negative characteristic curve gradient, particularly if this gradient is at least 1/1° in terms of absolute value. As a result, it is possible to arrive an operating point with less output power while the rotational speed is increasing and taking up power, wherein the increase in rotational speed which is carried out in this context can, however, be comparatively small, while at the same time the change in the blade angle can, however, become comparatively small. The throttled operating point can therefore easily be reached and, in particular, is quickly changed back from said point to the reserve operating point.

At the same time it has been realized that merely selecting a relatively high rotational speed does not necessarily bring about an advantageous changeover, at least does not have to bring about an optimum changeover. It has particularly been realized that the throttled operating point also has to have a worse power coefficient, that is to say a lower Cp value, than the reserve operating point, because this has the precondition for less output power to be output. This can be achieved by adjusting the rotor blades. In order to return from the throttled operating point to the reserve operating point at the specified changeover, the rotor blades must also be rotated back again. In this context, it has been realized that the adjustment of the rotor blades requires a certain minimum time, specifically owing to the dynamics of the adjustment drives. In this respect it has been also realized that in the regions in which the iso-characteristic curves have a negative gradient, the iso-characteristic curves are also comparatively close to one another. This means that a comparatively pronounced change in the Cp value can be brought about with a comparatively small adjustment of the rotor blades.

Therefore, it is proposed for the throttled operating point that it be selected with respect to the reserve operating point in such a way that it can changeover to the reserve operating point with as little adjustment of the blades as possible, while at the same time the rotor rotational speed is reduced at this changeover and as a result kinetic energy can be converted into power. The changeover therefore occurs as quickly as possible and at the same time permits the increased output already to be output and fed in at the start of the changeover, to be precise according to the aimed-at reserve operating point.

It is preferably proposed that the characteristic curve gradient at the throttled operating point decreases with a value which is at least 0.5/1° in terms of absolute value. It has been realized that in this way a significant negative gradient is associated with iso-characteristic curves which lie particularly close to one another, and the Cp value can therefore be changed particularly quickly there, that is to say a large change of the Cp value occurs with the smallest possible change in the blade angle. This effect occurs particularly at tip speed ratios which are larger than the tip speed ratio of the normal operating point. The additional condition is also proposed that the throttled operating point has a tip speed ratio which is larger than the tip speed ratio of the normal operating point.

According to one refinement it is proposed that the reserve operating point be operated with a lower output power level in comparison with the normal operating point. At the reserve operating point, the wind power installation therefore outputs less power than at the normal operating point. However, the output power of the throttled operating point is also lower than at the reserve operating point. The reserve operating point therefore lies between the throttled operating point and the normal operating point of the level of the output power. If the operation of the wind power installation changes over from the throttled operating point to the reserve operating point, the output power level is therefore increased but not to the value of the normal operating point.

It is also or alternatively proposed that the reserve operating point has a reduced tip speed ratio in comparison with the throttled operating point. At the reserve operating point, the wind power installation therefore rotates more slowly than at the throttled operating point. It can therefore be ensured that in order to increase the output power level from the throttled operating point to the reserve operating point power can initially be acquired by braking the wind power installation.

There is optionally a provision that the reserve operating point has an increased tip speed ratio in comparison with the normal operating point. In this case, the tip speed ratio of the reserve operating point is therefore below that of the throttled operating point, but above that of the normal operating point. Accordingly, its rotational speed is also below that of the throttled operating point and above that of the normal operating point.

It has also been realized here that the return from the throttled operating point to the reserve operating point can be made easier by means of the increased initial rotational speed. Furthermore, it has been realized that a further changeover from the reserve operating point to the normal operating point using kinetic energy would also be possible in this sense.

According to a further refinement it is proposed that the throttled operating point and/or the reserve operating point be selected as a function of a distance between two iso-characteristic curves at the throttled operating point or the reserve operating point or as a function of a gradient of the power coefficient of the throttled operating point or of the reserve operating point.

Each iso-characteristic curve stands for a power coefficient. The closer the two iso-characteristic curves are to one another, the greater the extent to which the power coefficient changes where there is an otherwise identical change in an operating point in the $\lambda\theta$ diagram. Such a change in the blade angle value and/or the value of the tip speed ratio of an operating point in the $\lambda\theta$ diagram therefore brings about a more rapid change in the power coefficient when there is a short distance between the two iso-characteristic curves in this region. Therefore, it has been realized that the throttled operating point and the reserve operating point can be particularly close to one another even where the distance between two iso-characteristic curves is small.

Accordingly, it is proposed to select the throttled operating point and the reserve operating point as a function of a distance between two iso-characteristic curves. However, it can also be sufficient if just one of these two operating points is selected as a function of a distance between two iso-characteristic curves.

Alternatively, one of the two operating points or both operating points can be selected as a function of a gradient of the power coefficient of the throttled operating point or of the reserve operating point. The higher the gradient of the power coefficient in terms of absolute value, that is to say the greater the gradient of the power coefficient of the respective operating point, the closer the throttled operating point and the reserve operating point can be to one another. In this respect, the gradient of the power coefficient of the throttled operating point can be considered in order to select the throttled operating point, or the gradient of the power coefficient of the reserve operating point can be considered in order to select the reserve operating point. In particular it is proposed that the throttled operating point and/or the reserve operating point be selected where the gradient of the power coefficient is particularly large in terms of absolute value.

A derivative of the power coefficient can preferably be selected as a gradient of the power coefficient exclusively according to the blade angle. It has been particularly realized here that a derivative of the power coefficient which is large in terms of absolute value according to the blade angle characterizes a region in which a small change in the blade angle can bring about large changes in the power coefficient, and therefore result in large differences in the corresponding output power levels of the respective operating points.

However, it is also possible to select a gradient which is derived according to the blade angle and also according to the tip speed ratio. For a comparable dimension between the blade angle and the tip speed ratio it can be appropriate to standardize the blade angle here to a whole angle degree. In the illustration of the $\lambda\theta$ diagram, the length of one degree of blade angle adjustment would then correspond to the length of a change in the tip speed ratio by the value 1.

According to one embodiment it is proposed that the throttled operating point and/or the reserve operating point be selected such that in each case a derivative of the power coefficient of the throttled operating point or of the reserve operating according to the blade angle exceeds a predetermined minimum derivative value in terms of absolute value. Therefore, the derivative of the power coefficient according to the blade angle is considered. The larger this derivative is in absolute terms, the greater the extent of change therefore of the power coefficient with the change in the blade angle. As a result, with a smaller change of the blade angle it is possible to achieve a large change in the power coefficient if a correspondingly large value is selected for this derivative. Therefore, a predetermined minimum derivative value is used as the basis for the absolute value of the derivative. Therefore, a quantitative measure can also be specified.

It is therefore particularly to be expected that the power coefficient decreases as the blade angle increases. This is also particularly due to the fact that a blade angle of 0° or of a few degrees is frequently used as the basis for an operating point with optimum power. However, a reduced power production is provided for the throttled operating point and under certain circumstances also for the reserve operating point. The output power is therefore lower while the blade angle is increased. Therefore, the absolute value of the derivative is considered because its absolute value could be negative.

The basis here is also again the concept that at a large derivative of the power coefficient in terms of absolute value, a large change in power can be achieved by just small changes in the attitude angle. This can be advantageous both for the throttled operating point and for the reserve operating point. In particular, according to one embodiment it is proposed for both operating points and as a result it is ensured that particularly the changeover from the throttled operating point to the reserve operating point can be carried out comparatively quickly. The duration of the change between these two operating points, that is to say in particular the duration for the changeover from the throttled operating point to the reserve operating point can be particularly determined by the time period which is required for the necessary adjustment of the blade angle.

The minimum derivative value for the throttled operating point is preferably at least 0.05/1°. It has been particularly realized here that the power coefficient can be reduced from a physical maximum somewhat above 0.45 logically at maximum to zero. The change in the power coefficient by a value of 0.3 is therefore a considerable reduction in power or considerable reduction of the power coefficient. In this respect it is proposed that for this purpose the rotor blade is to be adjusted at maximum by a value of 6° in order to achieve such a change in the power coefficient. As a result, the proposed minimum derivative value is obtained, specifically by means of the calculation: 0.3/6°=0.05/1°. This means that the rotor blade is to be adjusted at maximum by 6° in order to achieve a change in the power coefficient by the value 0.3.

It is also or alternatively proposed that the minimum derivative value for the reserve operating point is at least 0.1/6°. It has been realized here that although a large derivative of the power coefficient according to the blade angle can be appropriate for the reserve operating point, nevertheless said derivative can be somewhat smaller at the reserve operating point in terms of absolute value than at the throttled operating point. This is based in particular on the recognition that the reserve operating point has a higher power coefficient than the throttled operating point. The reserve operating point is therefore closer to the optimum operating point or to the normal operating point with respect to the power coefficient. In this context it has also been realized that it can be particularly important to change the power quickly to a power increase request starting from the throttled operating point. The change at the throttled operating point therefore has to preferably be more dynamic than at the reserve operating point.

According to one embodiment, the method is characterized in that the wind power installation can be characterized by a characteristic curve diagram composed of iso-characteristic curves in the λθ diagram. There are therefore a large number of iso-characteristic curves present, each of which is respectively assigned to a power coefficient, that is to say a Cp value. In this respect, the wind power installation is described in a customary fashion by such a characteristic curve diagram in the λθ diagram, at least in the way in which has already been explained above.

Furthermore, it is proposed that the characteristic curve diagram can be defined as a standardized characteristic curve diagram in which the blade angle is standardized to whole degrees (°). As a result, a gradient in the characteristic curve diagram can be defined which does not depend on the selection of the physical unit. Therefore, for example a change in the tip speed ratio by the value 1 is equated in magnitude to a change in the blade angle by 1°, which has been realized as appropriate.

In the standardized characteristic curve diagram a first sub-region is formed in which the blade angles are greater than the blade angle of the normal operating point, and the iso-characteristic curves have a negative characteristic curve gradient at which the tip speed ratio decreases as the blade angle increases. Only this region, which referred in illustrative terms, lies top right in the characteristic curve diagram is therefore considered if the blade angles are removed on the abscissa as the value increases, and the tip speed ratios are removed on the ordinate as the value increases.

It is the case that in the standardized characteristic curve diagram each operating point is characterized by a gradient value which quantifies the maximum gradient of the power coefficient of the operating point in the standardized characteristic curve diagram. In this respect, a customary definition of the gradient is used as the basis here. The gradient therefore describes the direction in which the power coefficient changes to the greatest extent in each case. This can be in the direction of the blade angle, in the direction of the tip speed ratio, but in particular in a direction which is made up of these two directions. The direction is therefore defined by the maximum gradient. The positive value of the gradient is the gradient value. The gradient direction is here otherwise not used further and is only required to define the maximum gradient value unambiguously.

In this first sub-region of the standardized characteristic curve diagram, an operating point with a maximum gradient is present for each iso-characteristic curve. All these operating points, from which therefore one can be found for each iso-characteristic curve, can be connected to a characteristic curve, and this characteristic curve is referred to here as a gradient characteristic curve. Therefore, a gradient characteristic curve can be formed which connects all these operating points to a maximum gradient value in the positive sub-region under consideration here.

It is therefore proposed that the throttled operating point and/or the reserve operating point be selected in such a way that they each lie on this gradient characteristic curve. This is also based on the idea that the throttled operating point and/or the reserve operating point lie/lies in the region of a derivative of the power coefficient which is as large as possible in terms of absolute value, in order as a result to be able to achieve a rapid and pronounced change in power with the smallest possible change in the blade angle. In this respect it is also realized that this maximum gradient characterizes, with respect to the blade angle and the tip speed ratio in the first sub-region in consideration, particularly the region in which a small change in the blade angle brings about a large change in the power coefficient. The change in power can therefore be achieved by a small blade adjustment and can therefore be achieved quickly.

It is therefore proposed to define this gradient characteristic curve, because the derivative of the power coefficient according to the blade angle is greatest there. This region can be clarified well by the definition and plotting of this gradient characteristic curve. If both the throttled operating point and the reserve operating point are selected such that they lie on this gradient characteristic curve, the changeover from the throttled operating point to the reserve operating point can preferably be performed along this gradient characteristic curve. This is an optimized solution for the fastest possible changeover between the throttled operating point and the reserve operating point, at least with respect to the blade adjustment.

If the gradient characteristic curve is not selected precisely for the selection of the throttled operating point and/or of the reserve operating point, the solution which is found may no longer be optimum, but it may nevertheless be a good one and therefore is proposed, at least according to one embodiment, for selecting the throttled operating point and/or the reserve operating point at least in a gradient band which includes the gradient characteristic curve. As a result it is also possible to take into account further boundary conditions because a degree of freedom for changes occurs as a result of the selection of an operating point in the band instead of on a characteristic curve.

Therefore, for example it is possible to consider the wear of the wind power installation as a boundary condition. Adaptations can also be implemented as a result. In particular, the characteristic curve diagram is subjected to slight changes because it can change it slightly, for example, due to soiling on the rotor blades. By means of a corresponding selection in the gradient band it is possible to easily take into account such a boundary condition and/or such a variation while at the same time the concept is maintained of selecting the throttled operating point and/or the reserve operating point at least in the vicinity of the gradient characteristic curve in order to facilitate a large change in the power coefficient through a small change in the blade angle.

Such a gradient band has an upper band limit, which lies above the gradient characteristic curve by a tip speed ratio difference. Furthermore, the gradient band has a lower band limit which lies below the gradient characteristic curve by a lower tip speed ratio difference. It is therefore proposed that the gradient band be formed by shifting the gradient characteristic curve upward by one value in the direction of the tip speed ratio in order to form the upper band limit, and be shifted downward by the same or by another value with respect to the tip speed ratio, in order to form the lower band limit.

The upper and lower tip speed ratio difference preferably each have a maximum value of 2. If the gradient characteristic curve therefore has the value 9 for the tip speed ratio at a point, the gradient band can also lie in the range between 7 and 11 for the tip speed ratio. The upper and lower tip speed ratio difference can, however, also have different values.

With respect to the proposal to select in each case at maximum the value 2, in particular to select at maximum the value 1, it has been realized that a change in the tip speed ratio by the range of the value 2 leads, in the region of the gradient characteristic curve, only to moderate changes in the derivative of the power coefficient according to the blade angle. Therefore, a change of at maximum the value +2 or −2 of the tip speed ratio can still preserve the character of the characteristic curve diagram that the derivative of the power coefficient according to the blade angle can still be considered to be high. At even higher values than the value 2, the changes in the respective operating point in the characteristic curve diagram can bring about significant changes in the character of the characteristic curve diagram so that when there are correspondingly larger values of the change in the tip speed ratio a range outside the gradient band is assumed.

Alternatively it is proposed that the upper tip speed ratio difference has at maximum the value 1, and the lower tip speed ratio difference has at maximum the value 4. Here, the band limits are therefore selected differently. It has been realized that in particular an excessively high rotational speed and therefore excessively high tip speed ratio is to be avoided in order to avoid an unstable operating point, so that a narrow interval is selected for the upper band limit. This problem does not occur for the lower rotational speed, at any rate only for very much higher rotational speed deviations, so that here a bandwidth of 4 has been realized as appropriate.

According to one refinement it is proposed that the wind power installation has at the throttled operating point a first output power level, a first rotational energy level and a first blade angle, and at the reserve operating point a second output power level, a second rotational energy level and a second blade angle. The first output power level is lower than the second output power level and a difference between the second output power level and the first output power level forms a differential output power level of the operating points. Furthermore, the first rotational energy level is higher than the second rotational energy level, and a difference between the first and second rotational energy levels forms a differential rotational energy level. These properties of the operating points and/or the properties of the wind power installation at these operating points form the basis for the further consideration, particularly for the selection of at least one of the operating points.

Furthermore it is taken into account that a blade adjustment time is required to adjust the rotor blades from the first blade angle to the second blade angle. This blade adjustment time depends on the adjustment speed of the rotor blades of the wind power installation, and also depends on the value by which the blade angles differ between the throttled operating point and the reserve operating point, by which value the blades therefore have to be rotated.

A product of the differential output power level and the blade adjustment time multiplied by 50% forms a characteristic differential energy level. Half of the product of the differential output power level with the adjustment time is therefore this characteristic differential energy level. This characteristic differential energy level, which can also be referred to here simply as differential energy level, is firstly a concept definition. However, it also has the following physical significance.

If the wind power installation is adjusted from the throttled operating point into the reserve operating point, wherein the assumptions and definitions specified above are taken as the basis, the output power level increases. In an ideal case, it increases linearly with the time, specifically when the rotor blades are adjusted uniformly, and the output power level is also increased in proportion to the adjustment of the rotor blades. With respect to the starting value, that is to say the output power level of the throttled operating point, the output power level therefore lies in the transition region by one differential value above the output power level of the throttled operating point, and in the specified ideal case this differential value increases linearly with the time until the output power level of the reserve operating point is reached. If this difference value of the output power level is integrated over this time, the characteristic differential energy level is obtained. Therefore if a linear rise is assumed, the differential energy level is the integration of the difference from the output power level over the time in which the changeover occurs from the throttled operating point to the reserve operating point.

On the basis of this realization it is then proposed that the throttled operating point and/or the reserve operating point is selected such that the differential rotational energy level corresponds to the characteristic differential energy level.

The throttled operating point and/or the reserve operating point are therefore selected in such a way that they have different rotational speeds and these are selected with respect to one another here in such a way that a differential rotational energy level is set. This differential rotational energy level is tailored to the characteristic differential energy level, that is to say the energy which characterizes the transition from the throttled operating point to the reserve operating point.

This selection is based on the idea that this increase in power is ideally provided immediately in reaction to the power increase request. Ideally, the completely increased power should therefore not be present until the reserve operating point is reached. Accordingly it is proposed that this operating point be selected such that the increased power level can be provided immediately from the differential rotational energy level for this transition time. In particular, the entire power difference can be provided from the rotational energy at the start of the changeover. However, during the transition from the throttled operating point to the reserve operating point the power which is generated from the wind also increases gradually, and therefore the proportion of rotational energy which is required to provide the differential power also gradually tends toward zero until the reserve operating point is reached.

In order to achieve this, the throttled operating point is set in such a way that the differential rotational energy level is set in response to a given reserve operating point, or the reserve operating point can be set in such a way that the differential rotational energy level is set with respect to the given throttled operating point. However, both operating points can also be adjusted or selected together such that the differential rotational energy level is set.

It is also a consideration here that the two operating points, or the one of the two points which is adjusted, are/is found in an iterative method. It has particularly been realized that not only are the operating points to be selected such that the differential rotational energy level reaches a specific value, but also that the characteristic differential energy level which is decisive for this also depends on the blade adjustment time, and therefore also depends on the selected operating points.

However, it has also been realized that the transition from the throttled operating point to the reserve operating point possibly does not proceed in an ideally linear fashion. It has correspondingly been proposed that the throttled operating point and/or the reserve operating point be selected such that the differential rotational energy level lies above or below the characteristic differential energy level by at maximum a predetermined percentage deviation value. It is preferably proposed that the percentage deviation value is at maximum 60%, preferably 40%, in particular at maximum 20%. Therefore it is possible to take into account the fact that the profile is not ideally linear. Furthermore, in the case of an iterative method it is also possible to abort earlier, if, for example, a deviation of 20% is permitted.

However, it is proposed that the percentage deviation value is to be at maximum 60%. This is ensured in that the selection of the operating points or at least one of the operating points is tailored to the differential rotational energy level and also to the characteristic differential energy level, so that the described effect can be utilized without, however, giving rise to an excessive deviation also at an operating point which has, in particular an unnecessarily high or unnecessarily low rotational speed.

For this, a deviation of 40% can preferably be sufficient. This is proposed in particular when the boundary conditions are comparatively well known, in particular the changes in power in the transition region from the throttled operating point to the reserve operating point. Given particularly good knowledge of these transitions and therefore also particularly good knowledge of the characteristic curve diagram, and in addition if a linear or virtually linear behavior can be assumed in the transition region, 20% is advantageous as the maximum deviation.

According to one embodiment is it proposed that in order to set the throttled operating point, in particular starting from the normal operating point, an intermediate operating point is firstly set in a first adjustment step, wherein the intermediate operating point has the same Cp value as the throttled operating point, at least a Cp value which is changed by less than 20%. In this way, starting from the normal operating point or another starting point from which the throttle request is to be implemented, the throttled operating point is not adjusted to immediately, that is to say on a direct path. Instead, the intermediate operating point which already has the same Cp value as the throttled operating point which is to be adjusted to ultimately is firstly selected. From said intermediate operating point, the operating point is then changed from the intermediate operating point to the throttled operating point, while maintaining the Cp value.

It has particularly been recognized here that by changing the operating point to the intermediate operating point, the power reduction can be implemented. In this context, an operating point with a low rotational speed can be found, for example, without adjusting the blade angles. Such an operating point can also lead to less wear owing to the low rotational speed. Such an operating point can be set, for example, by virtue of the fact that starting from the normal operating point the output power is firstly increased somewhat, e.g., by several percent or only by one percent. This power level then lies at minimum above the maximum power level which can be generated from the wind at that moment. This brings about a situation in which the rotational speed drops. Therefore, the operating point changes and leaves the optimum range. The power coefficient therefore worsens and the operating point as a result migrates to the intermediate operating point.

However, the intermediate operating point is not very suitable for increasing the power level quickly again in response to a power increase request. Particularly if the rotational speed of the intermediate operating point is low, there is no or little kinetic energy available to thereby increase the power level at short notice and temporarily.

However, it has been realized that such a power increase request cannot be expected immediately after a changeover to the intermediate operating point. Instead it is proposed that the intermediate operating point be adjusted to only if it is known or expected that a power increase request does not occur. This is particularly known or to be expected if the network operator operates the electric supply network in a mode in which a power increase request is not provided. The power increase request can particularly be embodied in such a way that the wind power installation must react to a drop in frequency. This can also be referred to as a frequency control mode or as a mode with P(f) control. Such a mode can, however, be excluded or temporarily switched off by the network operator.

Then, the wind power installation can change to the intermediate operating point and, if appropriate, also be operated for longer at this intermediate operating point, specifically as long as the frequency control mode is not active.

However, at the same time there is provision that the intermediate operating point has the same Cp value as the throttled operating point. It has in fact been realized that with respect to other conditions, in particular boundary conditions, the initially adjusted to operating point with reduced output power does not have to be optimal. Particularly if the operating point is intended for reaction to a power increase request, because e.g., the frequency control mode is active or will soon be activated, it can be better to select the throttled operating point.

Therefore it is proposed that firstly the intermediate operating point be adjusted to and from then the throttled operating point is adjusted to or as a changeover into the throttled operating point, while maintaining the Cp value. In this context, the intermediate operating point can also be firstly maintained for a relatively long time period.

In particular it is proposed in a second adjustment step that there is a changeover from the intermediate operating point to the throttled operating point, and the changeover can be represented essentially as a change along an iso-characteristic curve in the λθ diagram. At the changeover from the intermediate operating point to the throttled operating point, the Cp value is therefore left unchanged, at least at any rate changes with a maximum deviation of 20% of the Cp value of the iso-characteristic curve of the throttled operating point. In this respect, small changes in the Cp value, limited here to 20%, can be acceptable and used particularly for compensating small changes which could be caused, for example, by changed aerodynamics of the rotor blades due to soiling.

According to one refinement it is proposed that the throttle request to request the operation of the wind power installation at the throttled operating point is embodied as an external specification which is received by a data interface (e.g., receiver, transceiver or data port) and/or in that the power increase request to request the operation of the wind power installation at the reserve operating point is embodied as a prescription for reaction to a state of the electric supply network which is sensed by the wind power installation. In particular, the power increase request is embodied as a prescription to carry out a power increase starting from the throttled operating point as a function of a sensed network frequency of the electric supply network.

It has been particularly realized here that two entirely different requests can be present and the two operating points are adapted thereto The throttled operating point is therefore selected if an external specification is present which can also be received via a data interface. This implies already that the throttle request tends to be comparatively long term. For example, such a throttle request may be one in which the network operator requests a reduction in the output power for a time period of 15 minutes or longer. The throttled operating point is then adjusted to and the wind power installation is operated over the longer term at this point.

The power increase request is in this respect rather a rapid request. Here, a prescription for reaction to a state of the electric supply network is present. Particularly a drop in frequency can therefore bring about the power increase request. For example, the dropping of the network frequency below a first lower frequency limit can lead to the wind power installation having to increase its power within less than 40 ms. Such a short-term request frequently does not at all permit the transmission and corresponding processing of a corresponding request signal. It is to be borne in mind here that if one wished to transmit such a signal from the outside, this frequency event would also ultimately have to be detected at the corresponding external location.

Instead, the wind power installation is prepared for reaction as quickly as possible to such a frequency event. Here, a division can be present in the electric supply network, by which a power supply has been divided. This can also signify a division of a supplying power plant. There is then spontaneously a power deficit in the electric supply network, and the network reacts immediately thereto with a frequency drop and the wind power installation can itself detect this frequency drop and must also react immediately and increase the power.

It has been particularly realized here that the throttled operating point and the reserve operating point are to be advantageously adapted to these two different types of request. Particularly, the throttled operating point is in this respect configured as a longer term operating point. The reserve operating point can be configured as a short term operating point, and in particular the throttled operating point and/or the reserve operating point are to be selected in such a way that a changeover from the throttled operating point to the reserve operating point can take place quickly, in particular in such a way that the power is increased as quickly as possible to this power increase request.

In addition, corresponding monitoring criteria are also to be configured, specifically the evaluation of corresponding signals which are to be received from the outside for the throttled operating point, and corresponding permanent monitoring of the network frequency, or if appropriate of other state variables of the electric supply network for the reserve operating point. Such a state variable of the electric supply network can, in particular, also be in addition to the specified variant of the change in frequency, a phase jump and/or a change of the network voltage in respect of its voltage amplitude.

According to one embodiment it is proposed that the wind power installation is operated at the throttled operating point for a longer time period than at the reserve operating point. In particular there is provision that it is operated at least 20 times as long at the throttled operating point as at the reserve operating point.

It has been realized here that the throttled operating point is provided for a relatively long power reduction. Particularly it is adapted to a case in which a throttle request requests a power reduction for at least a quarter of an hour, but in particular for a significantly longer time period. The throttled operating point is therefore to be set for a relatively long time and to be configured for that. This does not rule out the fact that, for example a power increase request suddenly already occurs after a minute; however, this brings about a very short-term increase in power. After this, the operating point can change back again to the throttled operating point.

The reserve operating point is, on the other hand, provided for brief and short-term power assistance. This operating point should give rise as quickly as possible to an increase in power particularly in response to a frequency drop. Said operating point is therefore preferably the reaction to an incident in the electric supply network, which can also be referred to as a fault. Such faults can frequently be remedied again within several seconds, and the reserve operating point is intended to provide assistance for this time. However, if this fault lasts somewhat longer, the reserve operating point can, of course also be maintained for correspondingly longer.

A wind power installation is proposed. Said installation has
- a rotor with rotor blades with an adjustable blade angle ($\theta$), wherein the rotor can be operated with a variable rotational speed, and wherein
- the wind power installation can be operated in a partial load range in which sufficient wind is not present to operate the wind power installation with rated power,
- the wind power installation can be operated as an operating point which can be specified in a changing fashion, and
- the operating point is characterized by the blade angle ($\theta$) and a tip speed ratio ($\lambda$), and wherein
- the operating point can be represented in a λθ diagram, wherein
  in the λθ diagram the tip speed ratio ($\lambda$) is plotted against the blade angle ($\theta$), and the operating point can be represented in the λθ diagram as a value pair composed of a blade angle (θ) and tip speed ratio (λ), wherein each operating point is assigned a power coefficient (Cp value), and a plurality of operating points with the same Cp value can be represented as an iso-characteristic curve in the λθ diagram, and the wind power installation has a control device, prepared to operate the wind power installation in the partial load range, and at the same time prepares to operate the wind power installation at a normal operating point at which the wind power installation is not operated in a throttled fashion if there is no request for throttling, to operate the wind power installation at a throttled operating point at which, in response to a throttle request, the wind power installation is operated with output power which is throttled in comparison with the normal operating point, and to changeover the operation of the wind power installation from the throttled operating point to a reserve operating point at which the wind power installation is operated with higher output power in comparison with the throttled operating point, in reaction to a power increase request wherein the operation of the wind power installation is implemented in such a way that the throttled operating point has an increased tip speed ratio in comparison with the reserve operating point, and the throttled operating point lies on an associated iso-characteristic curve in the λθ diagram, and the associated iso-characteristic curve has, at the throttled operating point, a negative characteristic curve gradient at which the tip speed ratio decreases as the blade angle increases.

The wind power installation therefore has a control device and is prepared to operate the wind power installation in the partial load range and to operate it in such a way that in this context the wind power installation is operated at a normal operating point, at a throttled operating point or is operated at a reserve operating point, depending on the request. This also includes changing over the operation of the wind power installation from the throttled operating point to the reserve operating point if a corresponding power increase request is present. All this is implemented in the control device. In particular, for this a corresponding program can be stored and implemented. The specific specifications for the respective operating points can also be stored by means of corresponding functional relationships. Furthermore or alternatively, different operating points can be stored for different wind speeds, and selected according to the wind speed and request. Intermediate points, that is to say operating points for wind speeds for which no operating point is stored, can be determined by interpolation from adjacent operating points.

The operation of the wind power installation is particularly implemented in such a way that in comparison with the reserve operating point the throttled operating point has an increased tip speed ratio, and the throttled operating point lies on an associated iso-characteristic curve in the λθ diagram, and at the throttled operating point the associated iso-characteristic curve has a negative characteristic curve gradient in which the tip speed ratio decreases as the blade angle increases. All these relationships can be implemented functionally and/or by virtue of the fact that operating points which satisfy these criteria are stored in a wind-speed-dependent fashion.

In particular it is proposed that the wind power installation, in particular the control device, is prepared to execute a method according to one of the embodiments described above. Particularly, the corresponding control method is implemented in the control device.

According to one embodiment it is proposed that a data interface is provided, for receiving and evaluating an external signal as an external specification of the throttle request. The throttle request can therefore be transferred as an external signal and thus as an external specification from the outside, for example from a network operator. Such a signal is received and evaluated with the data interface. The evaluation takes place at least in such a way that the received signal is detected as a throttle request and then can be processed further in the control device.

Furthermore, it is proposed that a sensing device (e.g., sensor) be provided for sensing and evaluating a state of the electric supply network. Such a sensing device can be provided in particular as a high-speed voltage sensing device (e.g., voltmeter or spectrum analyzer) with which the network voltage and therefore in particular also its frequency are sensed, for example, at corresponding connection terminals of the wind power installation. A state which is sensed in this way is additionally evaluated in order to check whether a power increase request is present as a prescription for reaction to the sensed state. Therefore, for example, the sensed voltage is evaluated with respect to its frequency and it is checked whether this frequency has such a value, in particular such a deviation with respect to a normal state, that it is to be evaluated as indicating that a power increase request is present. Correspondingly, there can then be a reaction to such a power increase request.

According to an embodiment it is proposed that a control memory is provided and control prescriptions are stored in the control memory to operate the wind power installation according to at least one method according to an embodiment described above. Corresponding control prescriptions can therefore be saved in the control memory.

Furthermore or alternatively it is proposed that operating points which depend on the wind speed are saved, that is to say stored, in the control memory. In particular, this is proposed for a plurality of wind speeds and at the same time a normal operating point, a throttled operating point and a reserve operating point are respectively stored for each of these plurality of wind speeds. These three operating points are correspondingly selected in such a way that they satisfy the relationships, described above, between these three operating points. Correspondingly, these operating points can be determined for different wind speeds before the initial operation of a wind power installation, and can then be implemented. In this way, these operating points can be checked, for example in simulations, to determine whether the criteria are satisfied. It is also taken into consideration to check the operating points during the ongoing operation of the wind power installation in an offline method, in order, for example, to take into account changed properties of the wind power installation which had been detected. Such operating points which are newly determined can then be implemented in the wind power installation.

BRIEF DESCRIPTION OF THE SEVERAL VIEWS OF THE DRAWINGS

The invention may now be explained below in more detail on the basis of exemplary embodiments and with reference to the accompanying figures.

DETAILED DESCRIPTION

Figure 1:
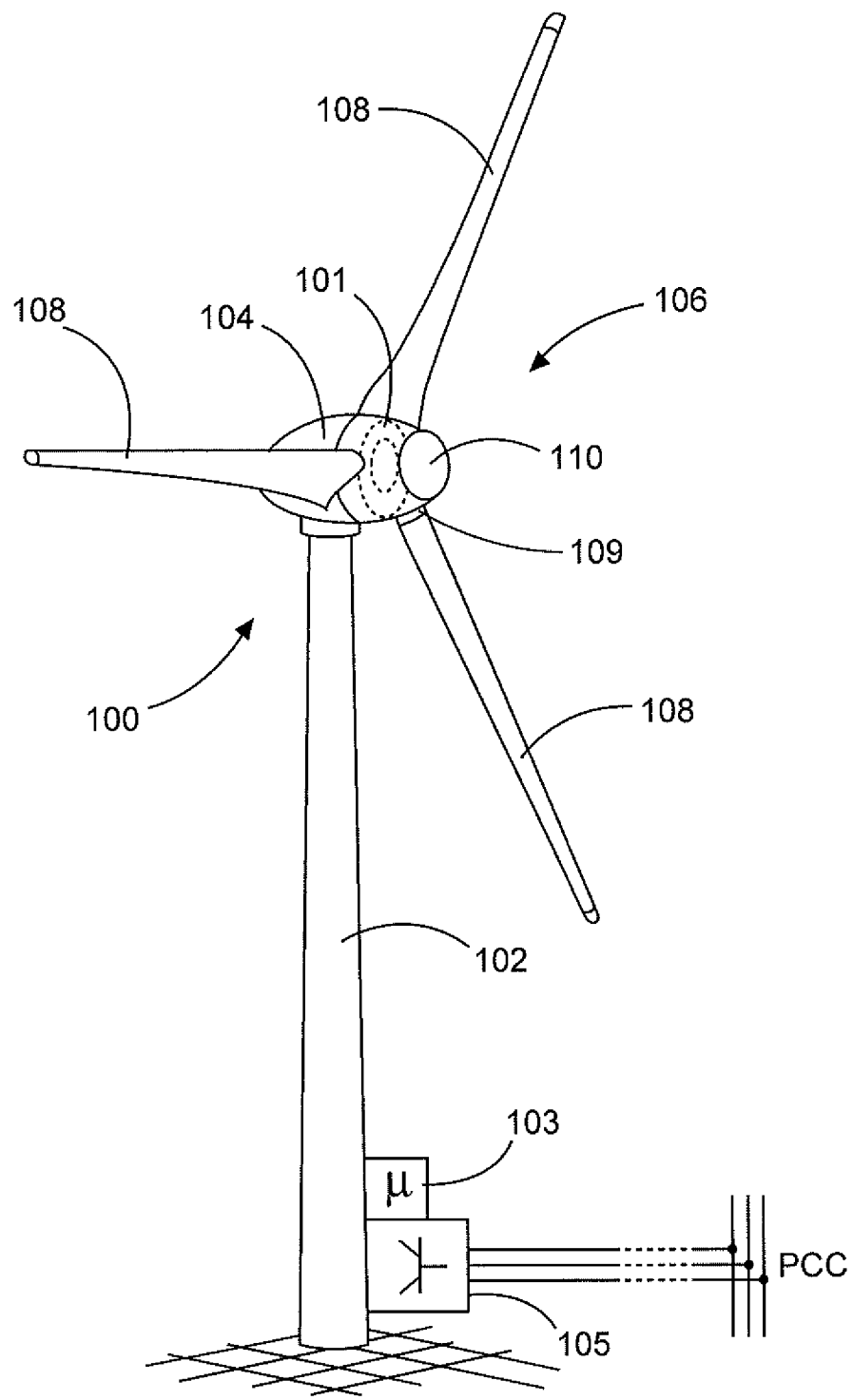
FIG. 1 shows a wind power installation in a perspective illustration.

FIG. 1 shows a schematic illustration of a wind power installation. The wind power installation 100 has a tower 102 and a nacelle 104 on the tower 102. An aerodynamic rotor 106 with three rotor blades 108 and a spinner 110 is provided on the nacelle 104. The aerodynamic rotor 106 is placed in a rotational motion by the wind during the operation of the wind power installation, and said rotor 106 therefore also rotates an electrodynamic rotor of a generator, which rotor is coupled directly or indirectly to the aerodynamic rotor 106. The electrical generator is arranged in the nacelle 104 and generates electrical energy. The pitch angle of the rotor blades 108 can be changed by pitch motors on the rotor blade roots 109 of the respective rotor blades 108.

The wind power installation 100 has here an electrical generator 101 which is indicated in the nacelle 104. Electrical power can be generated by means of the generator 101. A feed unit 105 is provided for feeding electrical power and can be embodied in particular as a power inverter. In this way, a three-phase feed current and/or a three-phase feed voltage can be generated according to amplitude, frequency and phase, to be fed into a network connection point PCC. This can also take place directly or else together with further wind power installations in a wind park. In order to control the wind power installation 100 and also the feed unit (inverter) 105 an installation controller 103 is provided. The installation controller 103 can also receive specification values from the outside, in particular from a central wind farm computer.

Figure 2:
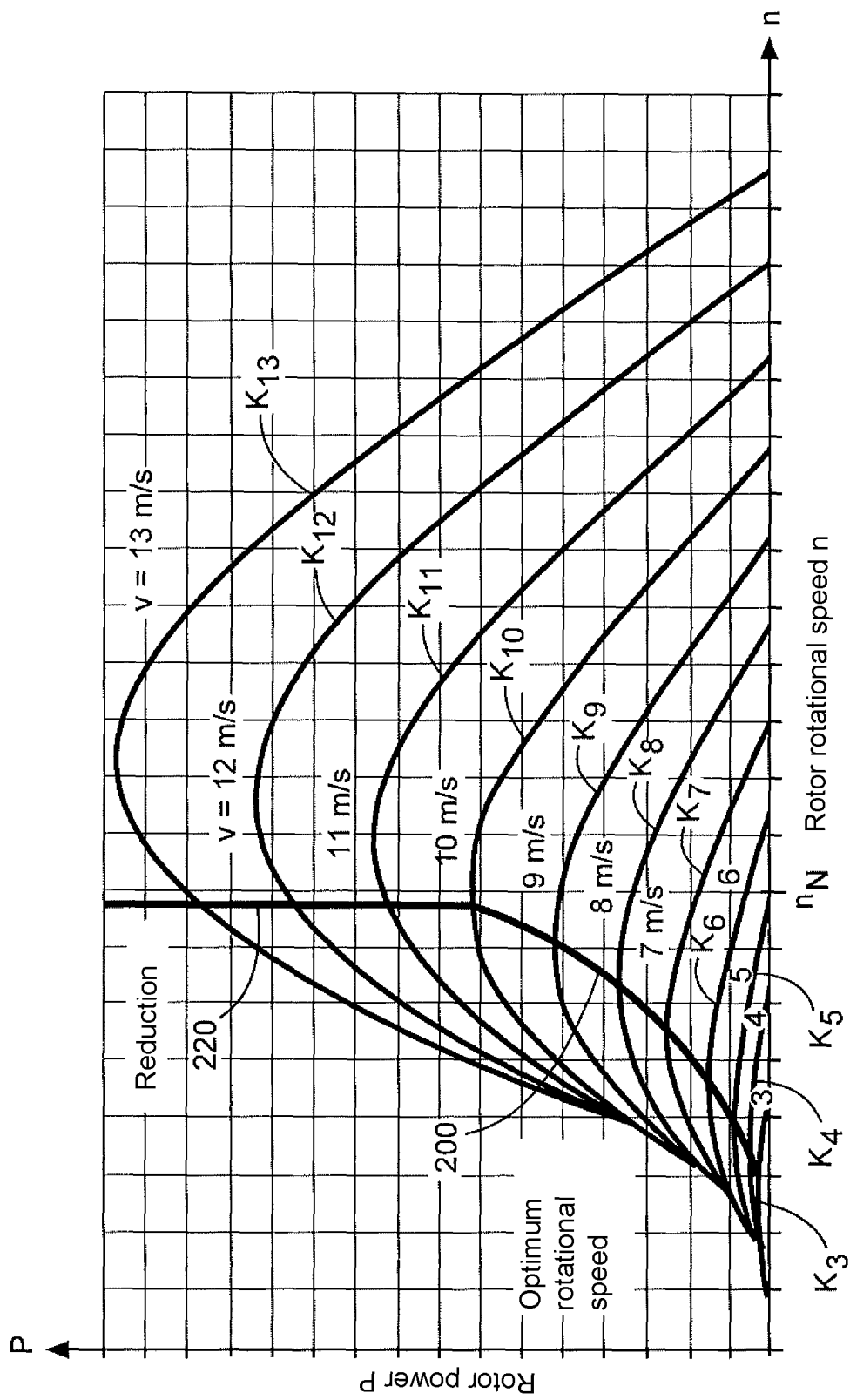
FIG. 2 shows a power/rotational speed diagram for different wind speeds.

FIG. 2 shows a diagram in which characteristic curves, which show the relationship between the rotor power P and rotor rotational speed n, are shown for different wind speeds. In this context, characteristic curves $k_3$-$k_{13}$ are illustrated. The index relates in each case to the associated value of the wind speed, specifically 3 m/s for $k_3$ to 13 m/s for $k_{13}$. It is apparent that as the rotational speed n increases on each of the characteristic curves $k_3$-$k_{13}$ the power P which can be generated firstly increases until a maximum is reached. Starting from the maximum, the power P then decreases again as the rotational speed increases. For optimum operation, that is to say for an optimum power coefficient and therefore maximum power generation the wind power installation is respectively operated at the maximum of the characteristic curves.

This is shown as an optimum operating characteristic curve 200 in FIG. 2. However, the wind power installation cannot be operated with randomly high rotational speeds but rather should not exceed a rated rotational speed $n_N$. This rated rotational speed $n_N$ is shown in the diagram. For wind speeds of 10 m/s, the maximum of the respective characteristic curve, that is to say the characteristic curve $k_{10}$, is approximately in the region of the rated rotational speed. In the case of characteristic curves for relatively high wind speeds, that is to say on the characteristic curves $k_{11}$-$k_{13}$, the maximum values occur at relatively high rotational speeds and there is correspondingly an inflection of the optimum operating characteristic curve when the maximum of the characteristic curve $k_{10}$ is reached, and said operating characteristic curve proceeds perpendicularly from there. From there, the wind power installation is no longer operated in the optimum operating mode, specifically in order to protect it against overloading.

The optimum operating characteristic curve 200 therefore relates, up to this inflection in the characteristic curve $k_{10}$, to the partial load range in which the wind power installation cannot yet generate maximum power. The perpendicular range is in this respect a reduced characteristic curve 220.

It is therefore in particular realized that both an increase in the rotational speed and a decrease in the rotational speed are therefore considered in order to reduce the power at low wind speeds. It has particularly been realized that as a result a degree of freedom in the selection of a throttled operating point can be utilized.

Figure 3:
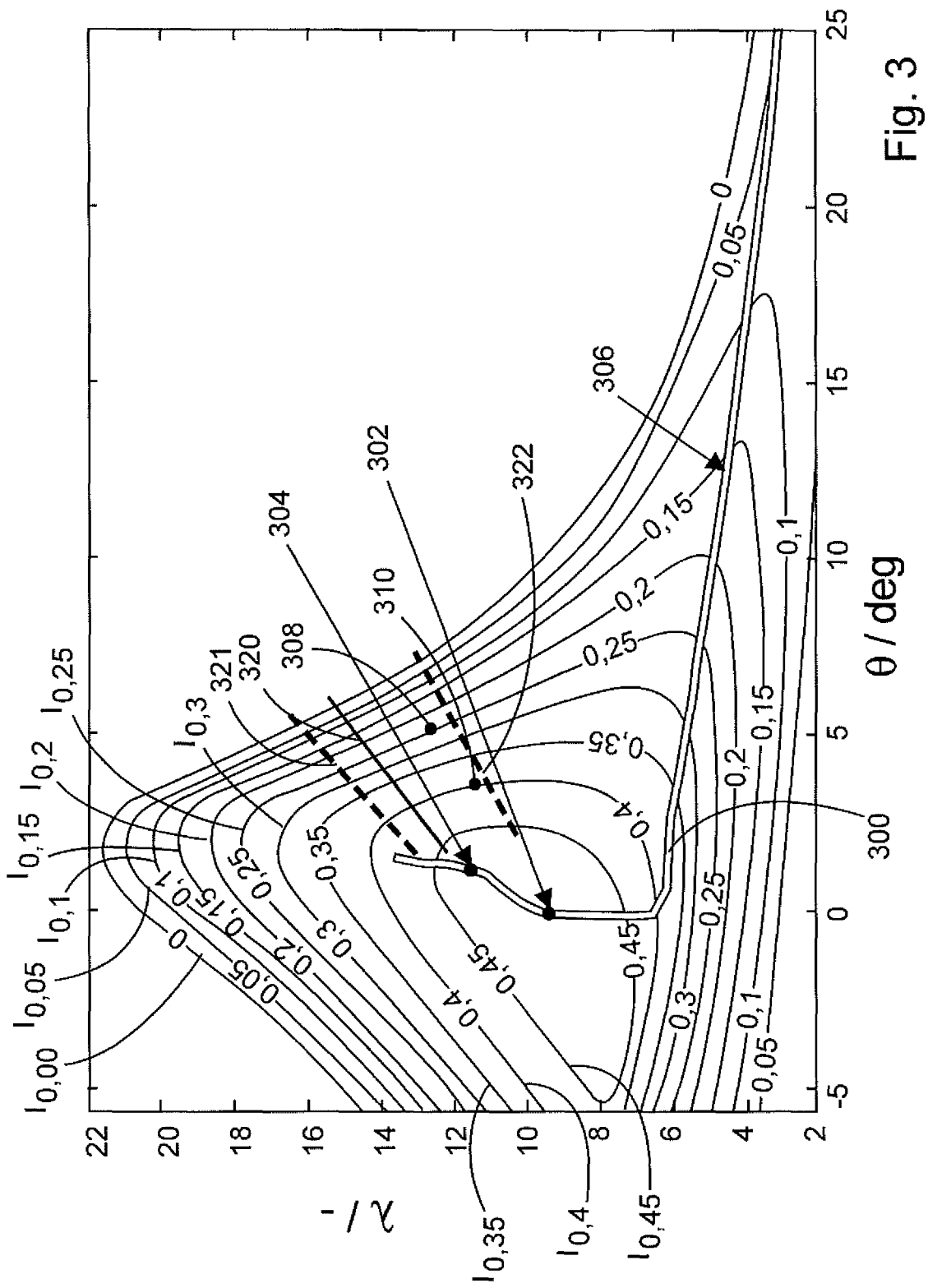
FIG. 3 shows a λθ-diagram.

FIG. 3 shows a portion of a λθ diagram. The tip speed ratio λ is illustrated on the ordinate therein, and the blade angle θ is illustrated on the abscissa with the unit degrees (°). The tip speed ratio λ without units is therefore plotted against the blade angle θ. In the λθ diagram iso-characteristic curves $I_{0,45}$ to $I_{0,00}$ are additionally shown. The index respectively specifies the associated power coefficient of the respective characteristic curve here. The power coefficient of the iso-characteristic curve $I_{0,45}$ is therefore 0.45. The iso-characteristic curves are entered here initially for a Cp value of 0.45 in uniform 0.05 increments up to the Cp value of 0.05, and as a last value of 0.00. The difference in the Cp value between two adjacent iso-characteristic curves is therefore always 0.05.

In addition, an installation operating characteristic curve 300 is entered in the diagram. This installation operating characteristic curve 300 represents the totality of the operating points of the wind power installation which are set according to the wind speed if there is no particular throttling request present. An optimal operating point 302 lies as it were in the center of the iso-characteristic curve $I_{0,45}$ for a Cp value of 0.45. The Cp value of the optimum operating point 302 may be slightly higher. Although the installation operating characteristic curve 300 is a characteristic curve along which the operating points can change, it can nevertheless be the case that at the optimum operating point 302 the operation of the wind power installation is carried out for a relatively large range of wind speeds. In other words, a very large number of operating points for different wind speeds may as it were occur one on top of the other at the optimum operating point 302.

Nevertheless, this optimum operating point 302 can vary with the wind speed. Owing to boundary conditions it is to be expected that at very low wind speeds, for example below 5 m/s, a relatively high tip speed ratio is appropriate. Correspondingly, a small change in the blade angle θ can then be appropriate. In order to illustrate this, a suboptimum operating point 304 is entered for low wind speeds, or the branch of the installation operating curve 300 in the vicinity of the suboptimum operating point 304 generally stands for operation at low wind speeds.

At high wind speeds, the tip speed ratio will decrease toward the end of the partial load range and beyond, as the wind speed increases. When the partial load range is exited, the blade angle θ is then increased in order to reduce the power of the wind power installation. This is characterized by the reduced characteristic curve branch 306.

There are many options for selecting a throttled operating point in the case of a throttling request, that is to say when the wind power installation is to continuously output less power in the partial load range than it could generate from the wind. Initially, ideally starting from the optimum operating point 302 an operating point is found at which the power coefficient is correspondingly lower than in the case of the optimum operating point 302. If the wind power installation is intended to generate, for example, approximately half as much power at the throttled operating point as at the optimum operating point, it is proposed that the throttled operating point be selected on the iso-characteristic curve $I_{0,25}$. Correspondingly, a throttled operating point 308 is entered as an illustrative example in the diagram in FIG. 3.

Furthermore, a reserve operating point 310 is provided which has a higher output power level than the throttled operating point 308, and therefore would be selected, for example, on the iso-characteristic curve $I_{0,40}$ for a power coefficient of 0.4.

It is now proposed that the throttled operating point 308 have an increased tip speed ratio in comparison with the reserve operating point 310. Correspondingly, these two operating points 308 and 310 are entered in the diagram in FIG. 3. If there is then a changeover from the throttled operating point 308 to the reserve operating point 310, specifically in reaction to a power increase request, the rotational speed for this is reduced somewhat because the tip speed ratio $\lambda$, must be reduced for this. Assuming an identical wind speed, the reduction in the tip speed ratio is therefore a reduction in the rotational speed. As a result, kinetic energy can be released and as a result a power increase can be achieved immediately, said increase already starting before the reserve operating point 310 has been reached.

It is also apparent from the diagram in FIG. 3 that the throttled operating point 308 lies on an associated iso-characteristic curve, that is to say the iso-characteristic curve $I_{0,25}$, which namely has this desired Cp value of 0.25, and that at this throttled operating point 308 this iso-characteristic curve $I_{0,25}$ has a negative characteristic curve gradient on which the tip speed ratio decreases as the blade angle increases. The gradient of the iso-characteristic curve $I_{0,25}$ is approximately $-2.2/1°$ here.

From the diagram in FIG. 3 it is apparent that the throttled operating point 308 resulting from the proposed selection, specifically including the selection according to which the characteristic curve gradient is negative at the throttled operating point, is not located in the region in which the installation operating characteristic curve 308 occurs or could occur at low wind speeds. It is also apparent that at these values of a higher tip speed ratio than the reserve operating point but a negative characteristic curve gradient here the characteristic curves are very close to one another. The illustrated distance in FIG. 3 between the throttled operating point 308 and the reserve operating point 310 is as a result comparatively small. In order to move from the iso-characteristic curve $I_{0,25}$ to the iso-characteristic curve $I_{0,4}$ in the selected range, only a blade adjustment of less than 2° is necessary. This rapid change capability can be provided by means of the proposed selection of the throttled operating point and of the reserve operating point, in particular by means of the selection of the throttled operating point with respect to the reserve operating point.

In addition, a gradient characteristic curve 320 with an upper band limit 321 and a lower band limit 322 is entered in FIG. 3. Both band limits are entered by dashed lines and different values for the distance between the band limits have been selected here so that the gradient characteristic curve in the band lies further upward with respect to the upper band limit.

Figure 4:
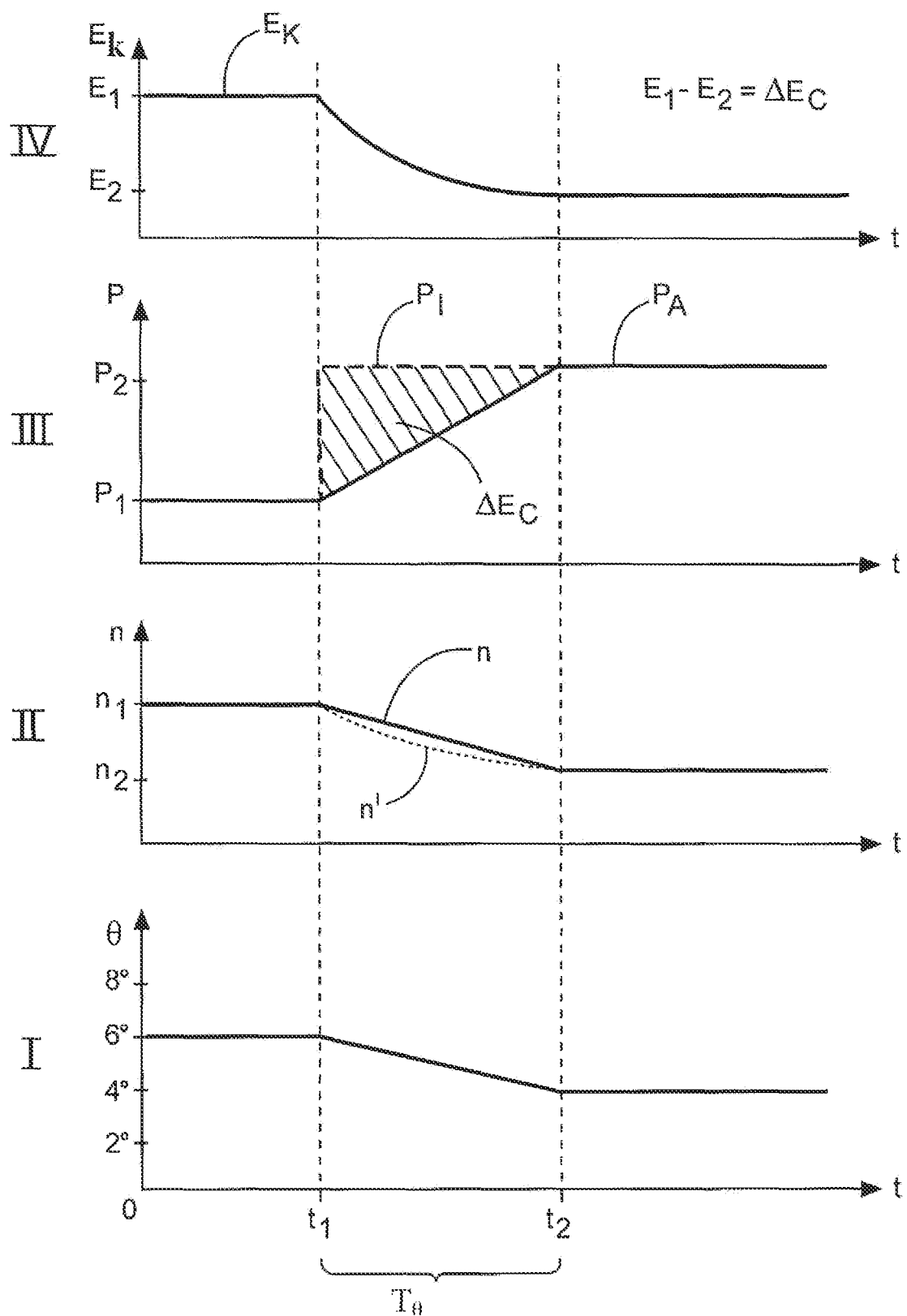
FIG. 4 shows a time diagram illustrating a transition from a throttled operating point to a reserve operating point.

FIG. 4 illustrates a preferred selection of the throttled operating point with respect to the reserve operating point taking into account the kinetic energy of both operating points. For this purpose, FIG. 4 illustrates the plurality of time profiles, specifically in four individual diagrams. Each diagram uses the same time axis. FIG. 4 illustrates here the changeover from a throttled operating point to a reserve operating point. This changeover starts at the time $t_1$, at which the throttled operating point is exited and ends at the time $t_2$ when the reserve operating point is reached. The illustrated changeover can relate to a changeover of the throttled operating point 308 to the reserve operating point 310 according to FIG. 3.

In order to change the throttled operating point to the reserve operating point, the blade angle is adjusted somewhat linearly, for example, from 6° to 4°. This is illustrated in the lower diagram I, which can be referred to as a diagram of the blade angle profile. It is assumed that the blade angle is adjusted with the maximum adjustment speed, and therefore for this the blade adjustment time $T_\theta$, that is to say the difference between $t_2$ and $t_1$, is required.

At the same time, the rotational speed n decreases, in an idealized approximately linear fashion, from the value $n_1$ at the time $t_1$, that is to say the rotational speed of the throttled operating point, to the rotational speed $n_2$ at the time $t_2$, that is to say the rotational speed of the reserve operating point. This is illustrated in the diagram II, which therefore forms a diagram for representing the rotational speed profile.

The throttled operating point therefore has a lower output power level with the value $P_1$, while the reserve operating point has an increased output power level with the value $P_2$. Accordingly, the output power level $P_A$ increases from the value $P_1$ to the value $P_2$, specifically from the time $t_1$ to the time $t_2$.

In this respect, the power which the wind power installation generates from the wind and outputs at the respective operating point is to be understood as the output power $P_A$. The output power $P_A$ is also to be understood as that which is generated from the wind in the range between the times $t_1$ and $t_2$, that is to say in the transition range, when the changeover occurs between the throttled operating point and the reserve operating point.

However, it is now proposed that the fed-power be increased initially more quickly in the transition range, in order to reach the value $P_2$ as quickly as possible. Such a power level can be referred to as an instantaneous power level $P_I$ and is entered as a dashed line in the third diagram III. This third diagram III therefore denotes a diagram for the profile of the power.

In an ideal case, it is possible to extract so much power from the kinetic energy of the rotor of the wind power installation at the time $t_1$, or directly thereof, that the power increases immediately to the value $P_2$. Then, more power is fed into the electric supply network than the output power $P_A$ which is present. This output power $P_A$ approaches, however, the instantaneous power level, $P_I$ slowly and reaches it at the time $t_2$.

From the idealized increase in the instantaneous power $P_I$ in comparison with the output power $P_A$ in the time from $t_1$ to $t_2$ an approximately triangular region is therefore obtained which is illustrated in a hatched fashion in this diagram III. Its surface content corresponds to an energy level which is referred to as a characteristic differential energy level $\Delta E_c$.

In addition, in the fourth diagram IV the profile of the kinetic energy $E_k$ of the wind power installation is illustrated. The profile of the kinetic energy $E_k$ between the times $t_1$ and $t_2$ corresponds approximately to the negative integral of the power differential range which is illustrated in a hatched fashion in diagram III. In an ideal case, the difference between the initial kinetic energy $E_1$ minus the kinetic energy $E_2$ which is reached at the time $t_2$ corresponds to the characteristic differential energy level $\Delta E_c$.

It is to be noted that this FIG. 4 serves for illustrative purposes and represents an idealized case. It is of course to be particularly noted that when there is a very strong increase in the instantaneous power $P_I$ shortly after the time $t_1$ with the correspondingly strongly decreasing energy value of the kinetic energy $E_k$, the rotational speed n would also decrease strongly, as illustrated. This is indicated in the second diagram II by a dotted line and denoted as n'.

A correspondingly more rapid drop in the rotational speed could also have effects on the profile of the output power $P_A$ in the diagram III. However, a more rapid drop in the rotational speed n would not necessarily cause the output power $P_A$ to increase correspondingly more quickly at the same time, because from FIG. 3 it is apparent that a relatively fast drop in the rotational speed, that is to say a relatively fast drop in the tip speed ratio, would not necessarily bring about a faster increase in the power coefficient.

It has therefore been realized that the characteristic differential energy level $\Delta E_c$ can be calculated in good approximation from the product of the different output power, that is to say $P_2$ minus $P_I$, and the blade adjustment time $T_\theta$ and additionally multiplied by ½. Accordingly, it is proposed that the throttled operating point and/or the reserve operating point be selected such that the differential rotational energy level be selected approximately with the order of magnitude of the characteristic differential energy level $\Delta E_c$.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for controlling a wind power installation, the method comprising:
   determining whether a throttle request has been received,
     in response to determining that a throttle request has not been received, operating the wind power installation at a normal operating point at which the wind power installation is operated at a rated power of the wind power installation, wherein the wind power installation is operated in a partial load range when sufficient wind is not present to operate the wind power installation at the rated power of the wind power installation,
     wherein the wind power installation includes a rotor having a plurality of rotor blades, each rotor blade is adjustable to a plurality of blade angles, and wherein the rotor is configured to be operated with a variable rotational speed,
     in response to determining that the throttle request has been received, operating the wind power installation at a throttled operating point at which the wind power installation is operated with an output power that is throttled in comparison with the normal operating point;
   receiving a power increase request, and
   in response to receiving the power increase request, operating the wind power installation at a reserve operating point at which the wind power installation is operated with a higher output power in comparison with the output power at the throttled operating point,
     wherein the throttled operating point has a higher tip speed ratio than the reserve operating point,
     wherein each operating point of the normal operating point, the throttled operating point, and the reserve operating point is defined by a blade angle and a tip speed ratio and is configured to be represented by a tip speed ratio/blade angle diagram ($\lambda\theta$ diagram) in which the tip speed ratio is plotted against the blade angle,
     wherein each operating point of the normal operating point, the throttled operating point, and the reserve operating point is represented in the $\lambda\theta$ diagram as a value pair including the blade angle and the tip speed ratio,
     wherein each operating point of the normal operating point, the throttled operating point, and the reserve operating point is associated with a power coefficient,
     wherein each operating point of the normal operating point, the throttled operating point, and the reserve operating point has a same power coefficient and is configured to be represented by an iso-characteristic curve in the $\lambda\theta$ diagram, and
     wherein the throttled operating point is positioned on an associated iso-characteristic curve in the $\lambda\theta$ diagram, and the associated iso-characteristic curve has, at the throttled operating point, a negative characteristic curve gradient at which the tip speed ratio decreases as the blade angle increases.

2. The method as claimed in claim 1, wherein the negative characteristic curve gradient, at the throttled operating point, has an absolute value of at least 0.5/1°.

3. The method as claimed in claim 1, wherein the reserve operating point has:
   a lower output power than the normal operating point, and/or
   a lower tip speed ratio than the throttled operating point.

4. The method as claimed in claim 1, wherein the reserve operating point has a higher tip speed ratio than the normal operating point.

5. The method as claimed in claim 1, wherein the throttled operating point and/or the reserve operating point is selected as a function of:
   a distance between two iso-characteristic curves of the $\lambda\theta$ diagram at the throttled operating point or at the reserve operating point, and/or
   a gradient of the power coefficient of the throttled operating point or a gradient of the power coefficient of the reserve operating point.

6. The method as claimed in claim 1, wherein the throttled operating point and/or the reserve operating point are selected such that a derivative of the power coefficient of the throttled operating point or a derivative of the power coefficient of the reserve operating point according to a particular blade angle, exceeds a respective minimum value.

7. The method as claimed in claim 1, wherein:
   the wind power installation is characterized by a characteristic curve diagram including iso-characteristic curves of the $\lambda\theta$ diagram,
   the characteristic curve diagram is defined as a standardized characteristic curve diagram, in the standardized characteristic curve diagram, a first sub-region is formed in which blade angles are greater than blade angles of the normal operating point, and the iso-characteristic curves in the first sub-region have a negative characteristic curve gradient in which the tip speed ratio decreases as the blade angle increases, each operating point in the standardized characteristic curve diagram is characterized by a gradient value quantifying a maximum gradient of the power coefficient of the respective operating point in the standardized characteristic curve diagram, in the first sub-region of the standardized characteristic curve diagram, an operating point with a maximum gradient value is present for each iso-characteristic curve, and wherein a gradient characteristic curve is represented and connects operating points with maximum gradient values, the throttled operating point and/or the reserve operating point are selected such that they each are positioned on the gradient characteristic curve, and/or in a gradient band including the gradient characteristic curve, the gradient band has:
an upper band limit which is higher than the gradient characteristic curve by an upper tip speed ratio difference, and
a lower band limit which is lower than the gradient characteristic curve by a lower tip speed ratio difference.

8. The method as claimed in claim 7, wherein:
the upper and lower tip speed ratio differences have maximum values of 2,
the upper and lower tip speed ratio differences have maximum values of 1,
the upper tip speed ratio difference has a maximum value of 1, or
the lower tip speed ratio difference has a maximum value of 4.

9. The method as claimed in claim 1, wherein the wind power installation has:
at the throttled operating point:
a first output power level,
a first rotational energy level, and
a first blade angle, and
at the reserve operating point:
a second output power level,
a second rotational energy level, and
a second blade angle,
wherein the first output power level is lower than the second output power level, and a difference between the second output power level and the first output power level forms a differential output power level,
wherein the first rotational energy level is higher than the second rotational energy level, and a difference between the first and second rotational energy levels forms a difference rotational energy level,
wherein a blade adjustment time is used to adjust the plurality of rotor blades from the first blade angle to the second blade angle,
wherein a product of the differential output power level and the blade adjustment time multiplied by 50% forms a characteristic differential energy level, and
wherein the throttled operating point and/or the reserve operating point are selected such that the difference rotational energy level is above or below the characteristic differential energy level by a maximum percentage deviation value.

10. The method as claimed in claim 9, wherein the maximum percentage deviation value is 60%, 40% or 20%.

11. The method as claimed in claim 1, further comprising operating the wind power installation at an intermediate operating point, wherein a power coefficient of the intermediate operating point is the same as a power coefficient of the throttled operating point or different from the power coefficient of the throttled operating point by less than 20%.

12. The method as claimed in claim 11 further comprising:
operating the wind power installation at the throttled operating point.

13. The method as claimed in claim 1, wherein:
the throttle request is as an external signal received by a data interface of a controller, and/or
the power increase request is a signal indicative of a state of an electric supply network, wherein the state is sensed by the wind power installation.

14. The method as claimed in claim 13, wherein the signal indicative of the state of the electric supply network is a function of a sensed network frequency of the electric supply network.

15. The method as claimed in claim 1, wherein the wind power installation is operated for a longer time period at the throttled operating point than at the reserve operating point.

16. The method as claimed in claim 15, the wind power installation is operated at least 20 times as long at the throttled operating point than at the reserve operating point.

17. A wind power installation, comprising:
a rotor having a plurality of rotor blades having adjustable blade angles, wherein the rotor is capable of being operated with a variable rotational speed,
wherein the wind power installation is capable of being operated in a partial load range in which sufficient wind is not present to operate the wind power installation with a rated power of the wind power installation, and
a controller configured to:
operate the wind power installation in the partial load range;
determine whether a throttle request has been received;
in response to determining that a throttle request has not been received, operate the wind power installation at a normal operating point at which the wind power installation is operated at a rated power of the wind power installation; and
in response to receiving the throttle request, operate the wind power installation at a throttled operating point at which the wind power installation is operated with an output power that is throttled in comparison with the normal operating point;
receive a power increase request; and
in response to receiving the power increase request, operate the wind power installation at a reserve operating point at which the wind power installation is operated with a higher output power in comparison with the output power at the throttled operating point,
wherein each operating point of the normal operating point, the throttled operating point, and the reserve operating point is defined by a blade angle and a tip speed ratio and is configured to be represented by a tip speed ratio/blade angle diagram ($\lambda\theta$ diagram) in which the tip speed ratio is plotted against the blade angle,
wherein each operating point of the normal operating point, the throttled operating point, and the reserve operating point is represented in the λθ diagram as a value pair including the blade angle and the tip speed ratio, wherein each operating point of the normal operating point, the throttled operating point, and the reserve operating point is associated with a power coefficient, wherein each operating point of the normal operating point, the throttled operating point, and the reserve operating point has a same power coefficient and is configured to be represented by an iso-characteristic curve in the λθ diagram, wherein the throttled operating point has a higher tip speed ratio in comparison with the reserve operating point, and wherein the throttled operating point is positioned on an associated iso-characteristic curve in the λθ diagram, and the associated iso-characteristic curve has, at the throttled operating point, a negative characteristic curve gradient at which the tip speed ratio decreases as the blade angle increases.

18. The wind power installation as claimed in claim 17, wherein the controller comprises a data interface configured to receive an external signal indicative of the throttle request; and wherein the wind power installation includes a sensor configured to sense and evaluate a state of an electric supply network and provide a signal indicative of the state of the electric supply network to the controller, the signal being indicative of the power increase request.

19. The wind power installation as claimed in claim 17, comprising:

a control memory configured to:
store control information for operating the wind power installation; and/or
store the normal, throttled, and reserve operating points that are dependent on a wind speed, wherein the normal operating point, the throttled operating point, and the reserve operating point are stored for a plurality of wind speeds.

* * * * *